(12) United States Patent
Hoecker et al.

(10) Patent No.: US 11,220,955 B2
(45) Date of Patent: Jan. 11, 2022

(54) TURBOCHARGER FOR AN INTERNAL COMBUSTION ENGINE

(71) Applicant: BorgWarner Inc., Auburn Hills, MI (US)

(72) Inventors: Patric Hoecker, Landau (DE); Cathrin Bergner, Bensheim (DE); Uwe Tomm, Göllheim (DE); Alexander Studnev, Bechtheim (DE)

(73) Assignee: BorgWarner Inc., Auburn Hills, MI (US)

( * ) Notice: Subject to any disclaimer, the term of this patent is extended or adjusted under 35 U.S.C. 154(b) by 44 days.

(21) Appl. No.: 16/723,151

(22) Filed: Dec. 20, 2019

(65) Prior Publication Data

US 2020/0200071 A1 Jun. 25, 2020

(30) Foreign Application Priority Data

Dec. 21, 2018 (DE) .......................... 102018222793.4

(51) Int. Cl.
| | |
|---|---|
| *F02B 37/04* | (2006.01) |
| *F02B 39/10* | (2006.01) |
| *F02B 37/16* | (2006.01) |
| *F02B 37/00* | (2006.01) |
| *F01N 3/22* | (2006.01) |
| *F02B 37/18* | (2006.01) |

(52) U.S. Cl.
CPC ............... *F02B 37/04* (2013.01); *F01N 3/22* (2013.01); *F02B 37/004* (2013.01); *F02B 37/168* (2013.01); *F02B 37/183* (2013.01); *F02B 39/10* (2013.01)

(58) Field of Classification Search
CPC ........ F02B 37/04; F02B 39/10; F02B 37/183; F02B 37/168; F02B 37/004; F02B 37/164; F01N 3/22; F01N 3/20; F01N 13/08; F01N 3/30
USPC .................................... 60/606, 612; 123/562
See application file for complete search history.

(56) References Cited

U.S. PATENT DOCUMENTS

| | | | | |
|---|---|---|---|---|
| 3,988,894 A | * | 11/1976 | Melchior ................ | F02B 37/04 60/606 |
| 4,125,999 A | * | 11/1978 | Melchior ................ | F02B 37/04 60/606 |
| 4,367,626 A | * | 1/1983 | Schwartzman ....... | F01D 17/141 60/606 |
| 5,105,624 A | * | 4/1992 | Kawamura ............. | F02B 37/10 60/608 |

(Continued)

FOREIGN PATENT DOCUMENTS

EP 1154133 B1 11/2005

*Primary Examiner* — J. Todd Newton
(74) *Attorney, Agent, or Firm* — Howard & Howard Attorneys PLLC

(57) ABSTRACT

The invention relates to a compressor for inducting an internal combustion engine, comprising an electric motor (3) for driving a first compressor wheel (4), wherein, in at least one operating state, an inlet-side, first gas flow (5a) of the internal combustion engine (1) is compressed by the compressor (2), wherein the compressor (2) comprises a first compressor path (5) for the first gas flow (5a) and a second compressor path (6) for a second gas flow (6a), wherein the second gas flow (6a), in particular, in at least one operating state, opens into an exhaust gas flow (8) of the internal combustion engine (1) as a secondary air flow (6a).

11 Claims, 6 Drawing Sheets

(56) References Cited

U.S. PATENT DOCUMENTS

| | | | | |
|---|---|---|---|---|
| 5,340,286 | A * | 8/1994 | Kanigowski | F04D 29/059 |
| | | | | 417/407 |
| 5,400,597 | A * | 3/1995 | Mirabile | F02B 37/10 |
| | | | | 60/606 |
| 5,406,796 | A * | 4/1995 | Hiereth | F02B 37/164 |
| | | | | 60/605.2 |
| 5,937,650 | A * | 8/1999 | Arnold | F02B 37/005 |
| | | | | 60/605.2 |
| 6,062,026 | A * | 5/2000 | Woollenweber | F02B 37/14 |
| | | | | 60/605.2 |
| 7,013,879 | B2 * | 3/2006 | Brookshire | F02B 37/013 |
| | | | | 123/568.12 |
| 8,943,823 | B2 * | 2/2015 | Fiveland | F02D 29/06 |
| | | | | 60/605.2 |
| 9,316,180 | B2 * | 4/2016 | Heiermann | F02M 26/24 |
| 9,759,228 | B2 * | 9/2017 | Romblom | F04D 29/4206 |
| 10,006,346 | B2 * | 6/2018 | Kemmerling | F02B 37/16 |
| 10,316,740 | B2 * | 6/2019 | Fraser | F02B 37/14 |
| 2013/0098030 | A1 * | 4/2013 | Freund | F01N 5/02 |
| | | | | 60/599 |
| 2017/0016385 | A1 * | 1/2017 | Kindi | F04D 27/0269 |
| 2017/0335756 | A1 * | 11/2017 | Donkin | F04D 17/12 |
| 2018/0340480 | A1 * | 11/2018 | Mehta | F02D 41/024 |
| 2019/0178149 | A1 * | 6/2019 | Schroeder | F02B 37/10 |
| 2019/0249595 | A1 * | 8/2019 | Shutty | F02D 41/0007 |

* cited by examiner

TURBOCHARGER FOR AN INTERNAL COMBUSTION ENGINE

CROSS-REFERENCE TO RELATED APPLICATIONS

This application claims the benefit of German Application No. 102018222793.4 filed Dec. 21, 2018, the disclosure of which is herein incorporated by reference in its entirety.

TECHNICAL FIELD

The invention relates to a compressor for inducting an internal combustion engine according to the preamble of claim 1.

BACKGROUND

EP 1 154 133 B1 describes an arrangement having an internal combustion engine, a turbocharger and an additional compressor, wherein the additional compressor is used as a secondary air pump for conveying air into a catalytic converter.

The object of the invention is to specify a compressor for inducting an internal combustion engine, which enables a particularly flexible use in a gas system of the internal combustion engine.

SUMMARY OF THE INVENTION

According to the invention, this object is solved for a compressor mentioned at the start by the characterising features of claim 1. Various requirements, in particular, for mass flows and pressure ratios can be satisfied by providing two compressor paths for a first gas flow and a second gas flow.

Here, in at least one operating state, the second gas flow preferably generally opens into an exhaust gas flow of the internal combustion engine as a secondary air flow. In doing so, a quick heating of a catalytic converter, for example, can be achieved for cleaning the exhaust gas in the event of a cold start. Here, the second compressor path fulfils the function of a common secondary air system, wherein there is no need for a separate secondary air pump.

In principle, the electrically driven compressor can, in the context of the invention, be designed for permanent operation. With such a design, the compressor can be present as the only compressor in a gas system of the internal combustion engine. The gas compressed by the compressor can generally be air or a mixture of air and exhaust gas.

Yet, in general, the compressor is provided as an additional component, for example to one or more turbochargers. In such configurations, an electrically driven compressor is also referred to as an "E-booster". Here, the electrically driven compressor primarily has the function of ensuring a quickly reacting, transient compression of the gas flow, for example during acceleration processes.

The electrically driven compressor according to the invention can thus optimally integrate the function of an E-booster and a secondary air pump.

The invention preferably relates to compressors of internal combustion engines of motor vehicles, particularly preferably passenger vehicles, yet is not limited to this.

In a preferred embodiment of the invention, it is provided that the first compressor path is operated via the first compressor wheel, and the second compressor path is operated via the second compressor wheel. Particularly preferably, the compressor wheels here are arranged on a common drive shaft. In doing so, a particularly individual design of mass flows and pressure ratios can be made possible for the two gas flows.

In a first possible detailed design, the compressor wheels here each have an axially aligned gas supply, wherein the compressor wheels are oriented to be in opposition relative to the gas supply. A compact construction is hereby made possible, in which the rotating mass of the two compressor wheels is concentrated, in particular, via a short axial length.

In an alternative detailed design, the compressor wheels each have an axially aligned gas supply, wherein the compressor wheels are oriented in the same direction in relation to the gas supply. Here, a distribution of the rotating masses is obtained via a greater axial length.

In the interests of a simple construction, it can generally be provided that the two compressor wheels are arranged on the same side of the electric motor.

In an alternative embodiment, the electric motor can also be arranged between the two compressor wheels. In doing so, a particularly good and symmetrical support of the emerging rotation acceleration forces can be achieved by means of corresponding pivot bearings.

In a further alternative embodiment, it is provided that the two gas flows are formed as different branches of a multi-flow compressor housing. In doing so, different combinations of mass flows and pressure ratios can be generated in a simple manner, wherein, advantageously, only one compressor wheel is necessary.

In a generally advantageous embodiment, in at least one operating state, the second compressor path upstream of a device for the post-treatment of exhaust gas, preferably a catalytic converter, opens into an exhaust gas flow of the internal combustion engine. In doing so, the exhaust gas post-treatment or the catalytic converter can be brought to an operating temperature more quickly in the event of a cold start by means of an exothermic reaction of the second gas flow, e.g. with unburned fuel.

Also generally advantageously, the compressor can be arranged in a gas system of the internal combustion engine in addition to an exhaust gas turbocharger. The arrangement preferably takes place on the air side upstream or downstream of the exhaust gas turbocharger in series. Here, the exhaust gas turbocharger in stationary operation can extensively or completely undertake fresh air induction, wherein the electrically driven compressor is switched on as an additional compressor stage if needed. With such a function, the compressor is also referred to as an E-booster.

Depending on the requirements, the second compressor path can here open into an exhaust gas flow of the internal combustion engine upstream or downstream of the exhaust gas turbocharger. Particular preferably, the opening takes place upstream from the exhaust gas turbocharger.

Generally advantageously, in one operating state, the second gas flow and the first gas flow can be guided together. In doing so, frictional losses are avoided, which can occur, for example, when the second compressor path is obstructed when not in use. Such a solution can be achieved, for example, by means of a multi-port valve, in particular a 2/3-port valve. Yet, alternatively to this, the second compressor path can also be obstructed when not in use or let into the atmosphere or used for other purposes by interacting with the internal combustion engine or vehicle systems.

Further advantages and features of the invention emerge from the exemplary embodiments described below as well as from the dependent claims.

Several preferred exemplary embodiments of the invention are described below and are explained in more detail by means of the attached drawings.

DETAILED DESCRIPTION

Figure 1:
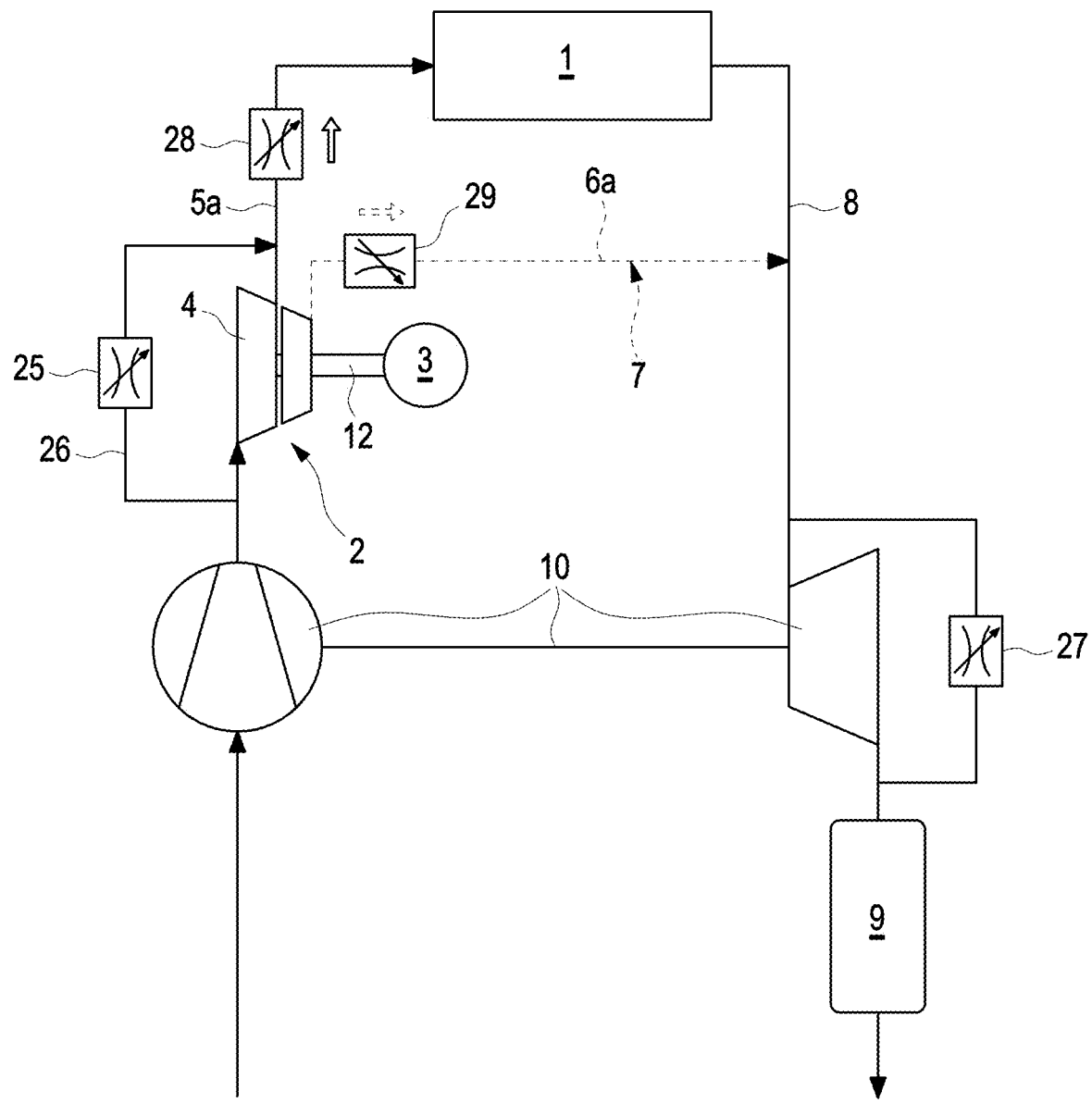
FIG. 1 shows a functional diagram of a compressor according to the invention in a gas system of an internal combustion engine.

The functional diagram shown in FIG. 1 shows an internal combustion engine 1 of a passenger vehicle. A gas system of the internal combustion engine comprises a compressor 2, which is driven via an electric motor 3.

The electric motor 3 drives a first compressor wheel 4 (see also FIG. 3, FIG. 6 and FIG. 7), by means of which an inlet-side, first gas flow 5a of the internal combustion engine 1 is compressed by the compressor 2 in a regular operating state of the internal combustion engine.

The compressor 2 according to the invention comprises a first compressor path 5 for the first gas flow 5a and a second compressor path 6 for a second gas flow 6a. The second gas flow 6a opens into an exhaust gas flow 8 of the internal combustion engine 1, at least in a first operating state, as a secondary air flow (SLS) 7.

In doing so, a quick heating of a device for the post-treatment 9 of exhaust gas, e.g. of a catalytic converter 9 for exhaust gas cleaning, is achieved in the event of a cold start of the internal combustion engine 1. Here, the second compressor path 6 fulfils the function of a common secondary air system, wherein a separate secondary pump is not needed.

In principle, the electrically driven compressor can, in the context of the invention, be designed for permanent operation. With such a design, the compressor can be present as the only compressor in a gas system of the internal combustion engine. Yet in the case of all of the exemplary embodiments described according to FIG. 1 to FIG. 9, the compressor is provided as an additional component to an exhaust gas turbocharger 10. In this configuration, the electrically driven compressor 2 is also referred to as an "E-booster". Here, the electrically driven compressor 2 primarily has the function of ensuring a quickly reacting, transient compression of the gas flow 5a, for example during acceleration processes of the internal combustion engine 1. The electrically driven compressor 2 according to the invention thus integrates the function of an E-booster and a secondary air pump.

The compressors 2 described in the present case are compressors 2 for internal combustion engines of motor vehicles, preferably passenger vehicles.

Figure 2:
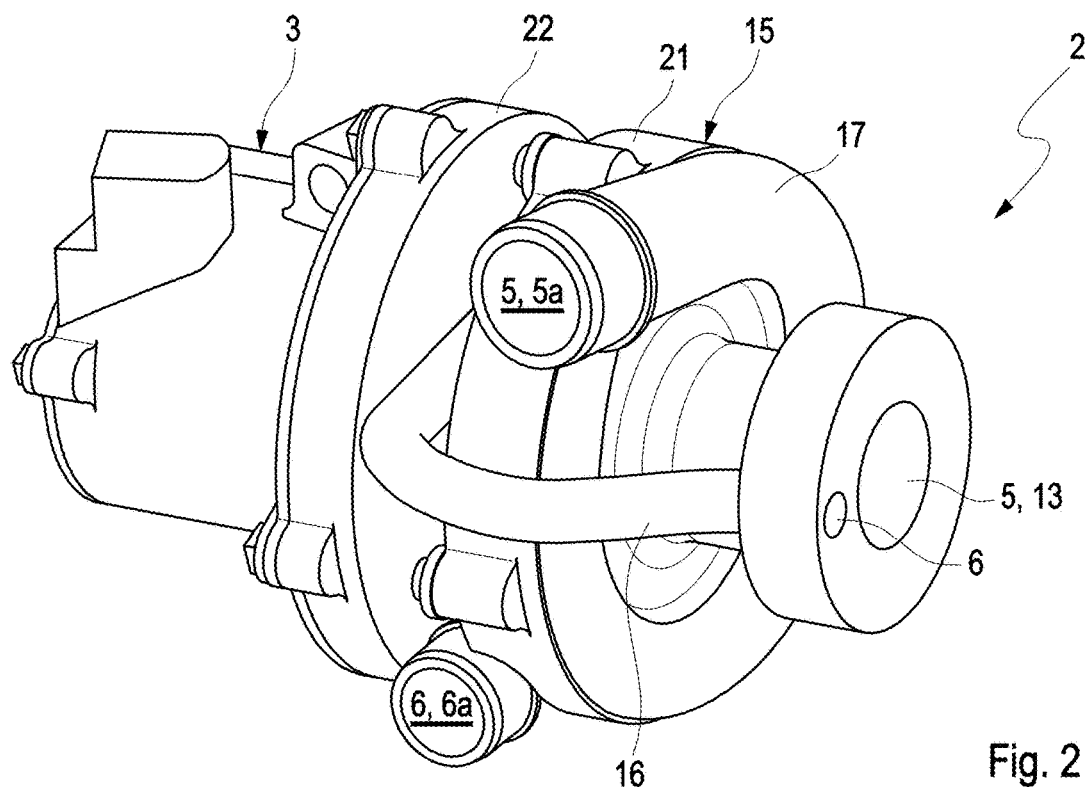
FIG. 2 shows a spatial view of a first exemplary embodiment of the compressor from FIG. 1.
Figure 3:
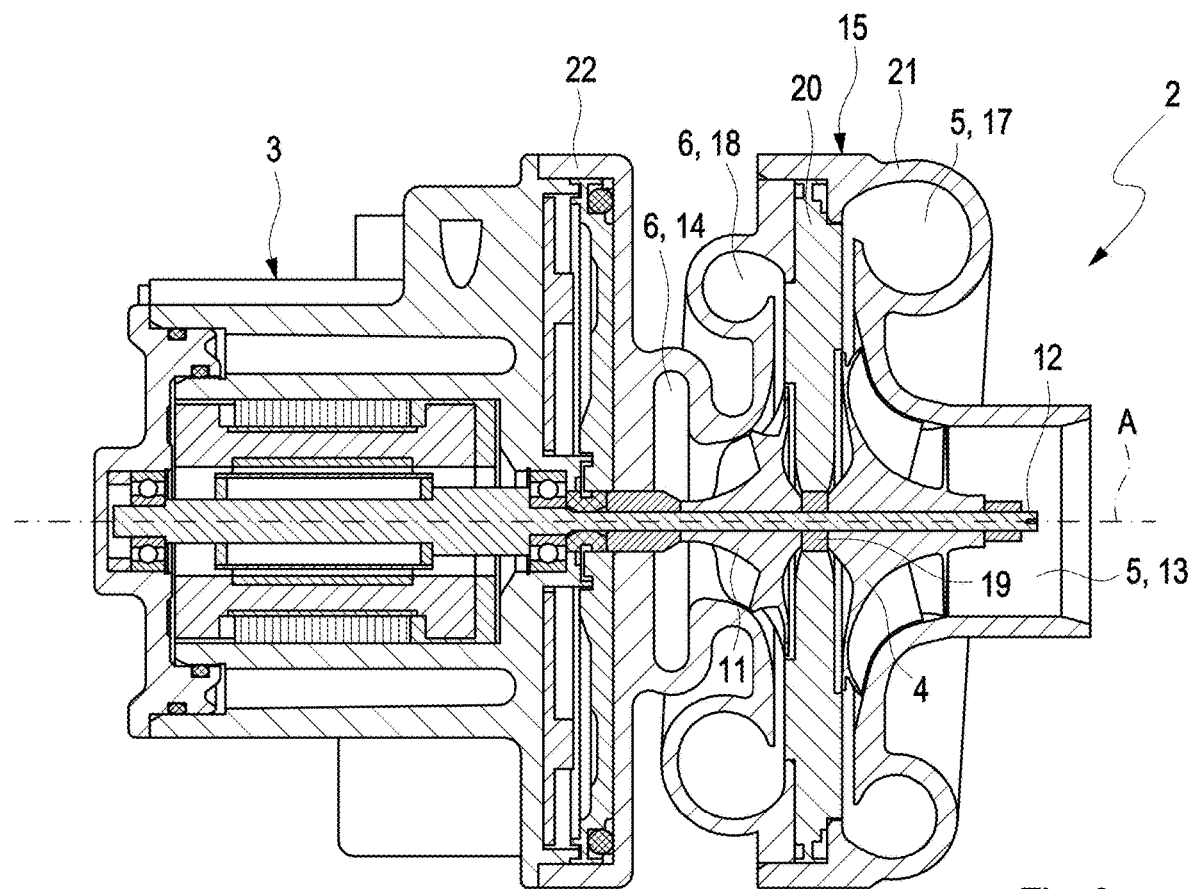
FIG. 3 shows a sectional view of the compressor from FIG. 2 along a shaft axis.

In a first concrete embodiment of a compressor 2 according to the invention according to FIG. 2 and FIG. 3, it is provided that the first compressor path 5 is operated via a first compressor wheel 4, and the second compressor path 6 is operated via a second compressor wheel 11. Here, the compressor wheels 4, 11 are arranged on a common drive shaft 12. A particularly individual design of mass flows and pressure ratios is thereby made possible for the two gas flows 5a, 6a.

As can be seen in FIG. 3, the compressor wheels 4, 11 here each have a gas supply 13, 14 aligned axially or in parallel to an axis A of the drive shaft 12, wherein the compressor wheels 4, 11 are oriented in opposition relative to to the gas supply 13, 14. In doing so, a compact construction is made possible, in which the rotating mass of the two compressor wheels 4, 11, in particular, is concentrated via a short axial length.

Here, a housing 15 of the compressor 2 has a first concentric inlet chamber 13 parallel to the axis A as the gas supply, via which the gas of the first gas flow 5a is guided onto the first compressor wheel 4.

A line 16 is guided past a first volute 17 of the first compressor path 5 to a second inlet chamber 14 of the second compressor path 6. The second gas flow 6a enters the second inlet chamber 14 from the line 16 as the gas supply and, therein, flows in the axial direction in opposition to the first gas flow 5a onto the second compressor wheel 11. The second gas flow 6a is conveyed through the second compressor wheel 11 into a second volute 18.

In particular, the sectional view FIG. 3 shows that the compressor wheels 4, 11 are arranged in opposition and lie with their respective rear sides towards one another.

There is a pivot bearing 19 between the two compressor wheels 4, 11 on a substantially disc-shaped base plate 20 of the compressor 2, said base plate extending perpendicularly to the axis A. A first housing part 21 and a second housing part 22 respectively form the volutes 17, 18 of the two compressor paths 5, 6. Ends of the volutes 17, 18 are respectively connected to corresponding lines (not depicted) for conveying the compressed gas flows. In the case of the first exemplary embodiment, the two compressor wheels 4, 11 and compressor paths 5, 6 are arranged on the same side of the electric motor 3.

Figure 4:
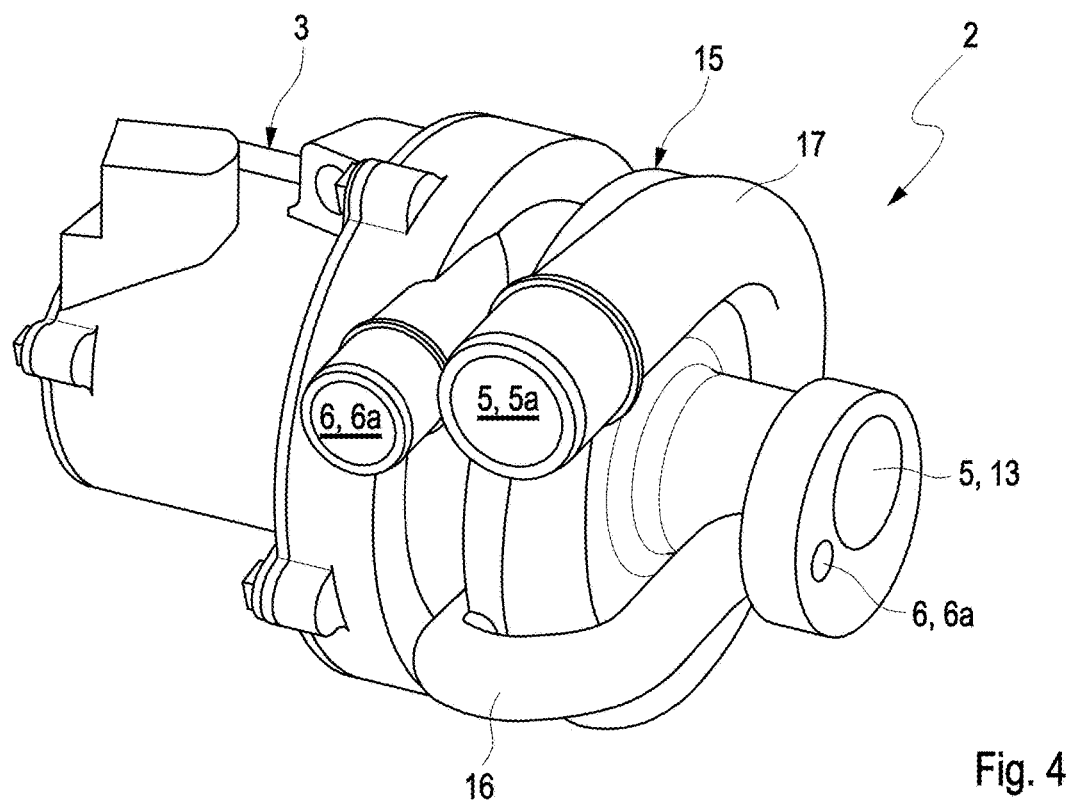
FIG. 4 shows a spatial view of a second exemplary embodiment of the compressor from FIG. 1.
Figure 5:
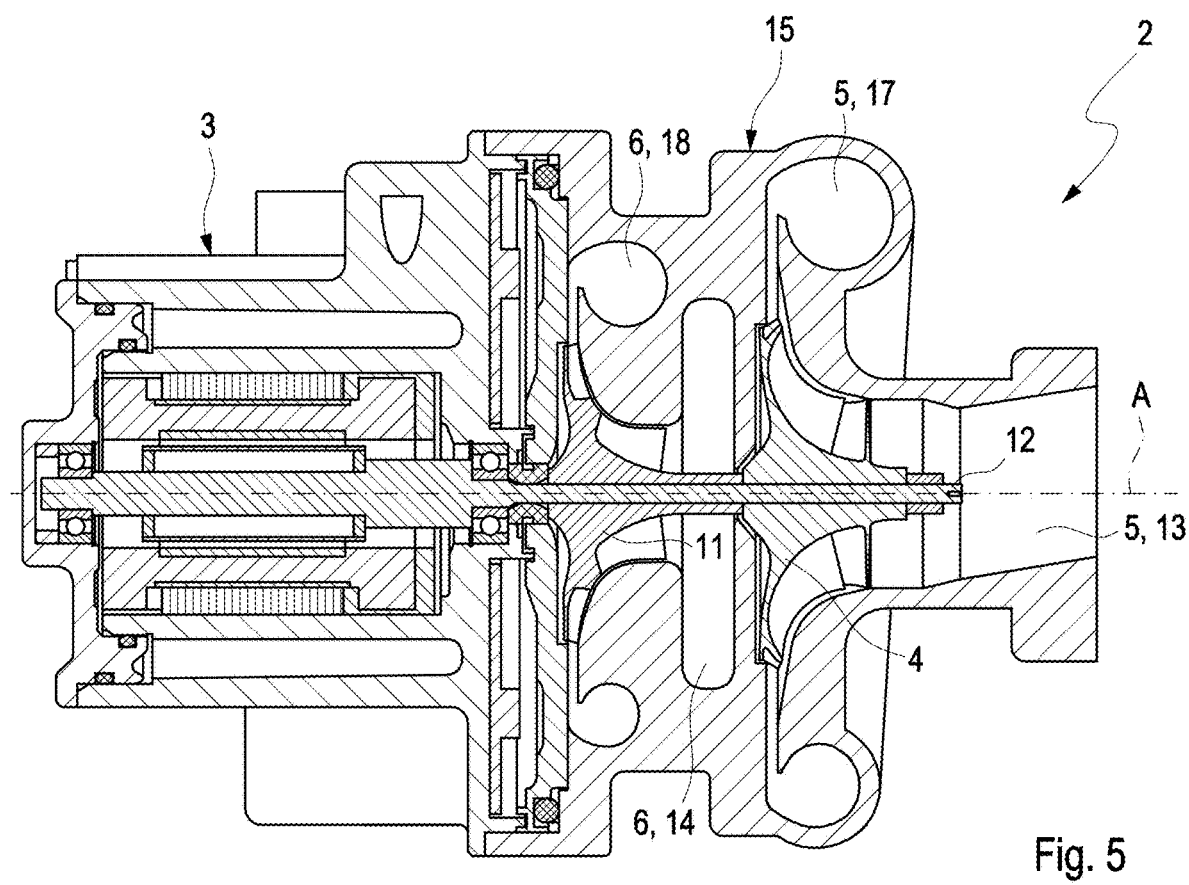
FIG. 5 shows a sectional view of the compressor from FIG. 4 along a shaft axis.

The second exemplary embodiment of a compressor according to the invention according to FIG. 4 and FIG. 5 differs from the first exemplary embodiment in that the two compressor wheels 4, 11 of the gas supply 13, 14 are oriented in the same direction. Here, a distribution of the rotating masses takes place across a greater axial length.

Corresponding to this construction, the second inlet chamber 14 is arranged in the axial direction between the compressor wheels 4, 11. The first inlet chamber 13 for the greater first gas flow 5a is, as in the first example, on a front end of the housing 15.

As far is reasonable, functionally identical components of the second exemplary embodiment have been provided with the same reference numerals as in the first exemplary embodiment.

Figure 6:
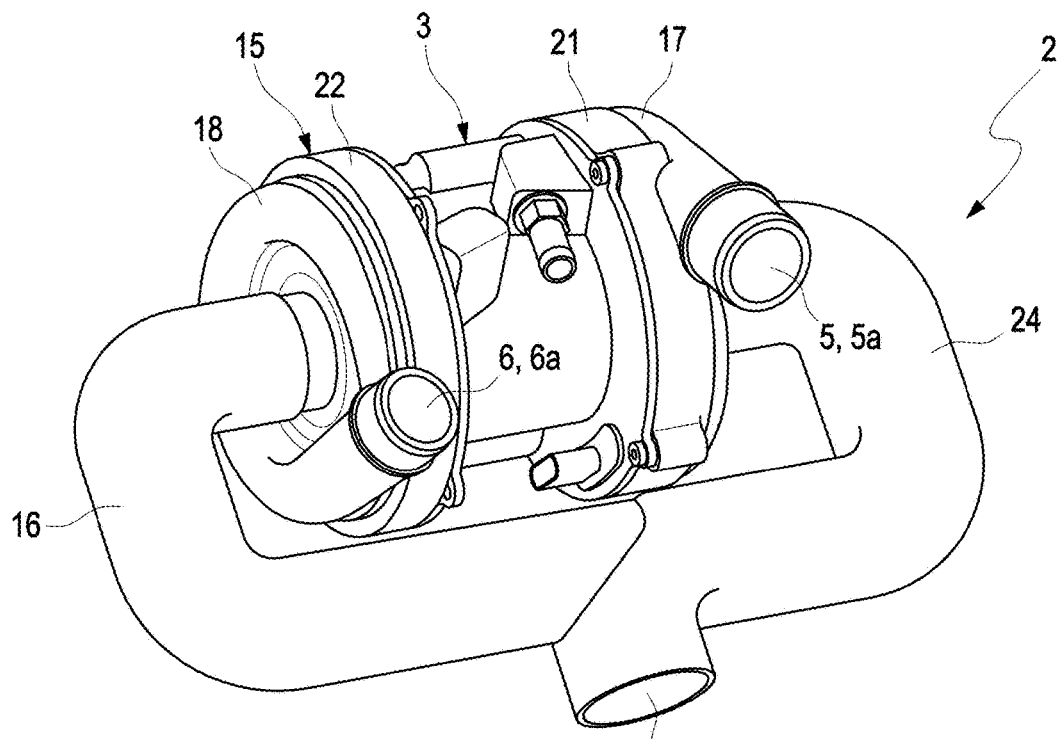
FIG. 6 shows a spatial view of a third exemplary embodiment of the compressor from FIG. 1.
Figure 7:
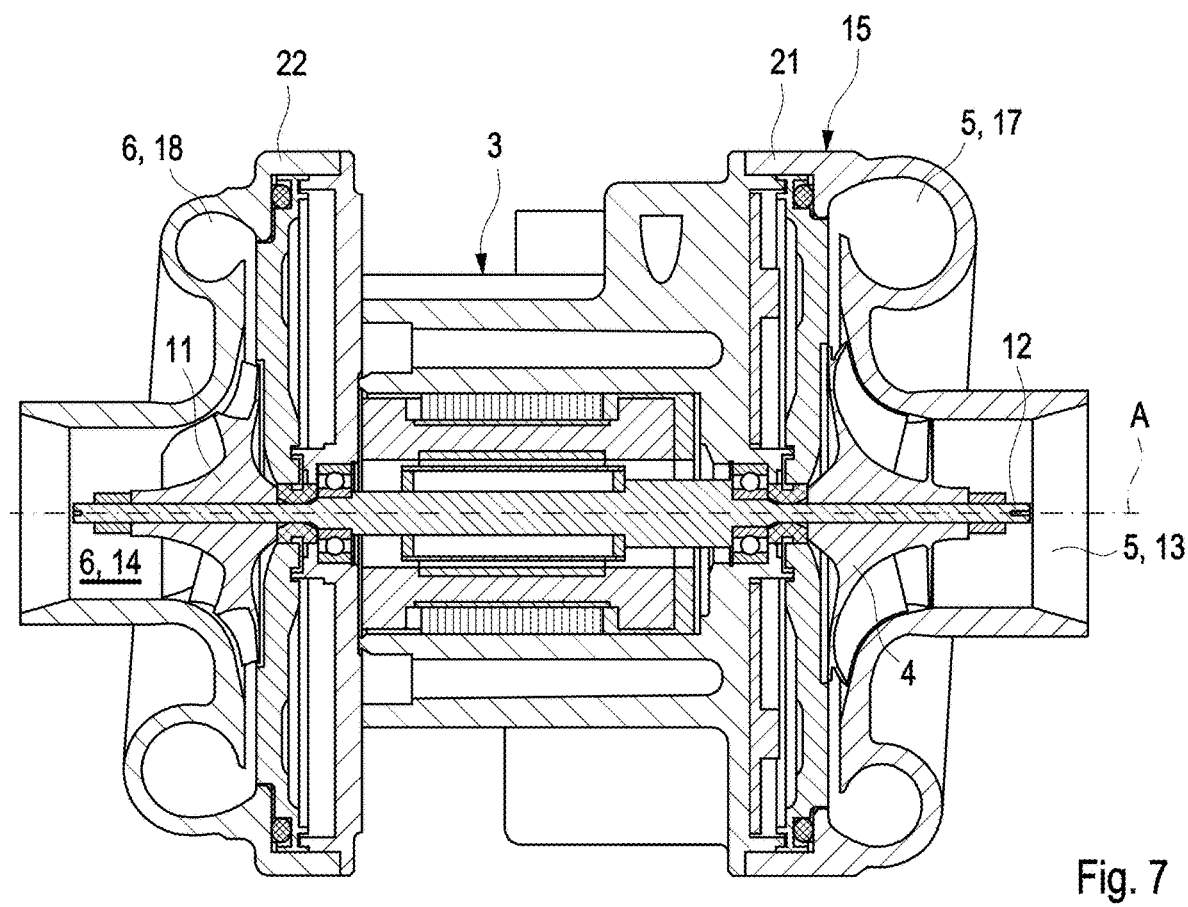
FIG. 7 shows a sectional view of the compressor from FIG. 6 along a shaft axis.

In a third exemplary embodiment according to the invention according to FIGS. 6 and 7, the electric motor 3 is arranged between the two compressor wheels 4, 11. A particularly good and symmetrical support of the emerging rotational acceleration forces can hereby be achieved by corresponding pivot bearings.

Here, the shaft 12 completely engages through the electric motor 3 and protrudes on each of its ends beyond one of the respective compressor wheels 4, 11 for mounting. The two gas flows 5a, 6a are supplied in opposition to each other in an axial direction. To do so, a central gas supply 23 branches into a line 24 of the first gas flow 5a and the line 16 of the second gas flow 6a. The lines 16, 24 then each comprise a deflection by 180°, such that the opening aligned in opposition into the respective inlet chambers 13, 14 takes place (see FIG. 6 and FIG. 7).

Figure 8:
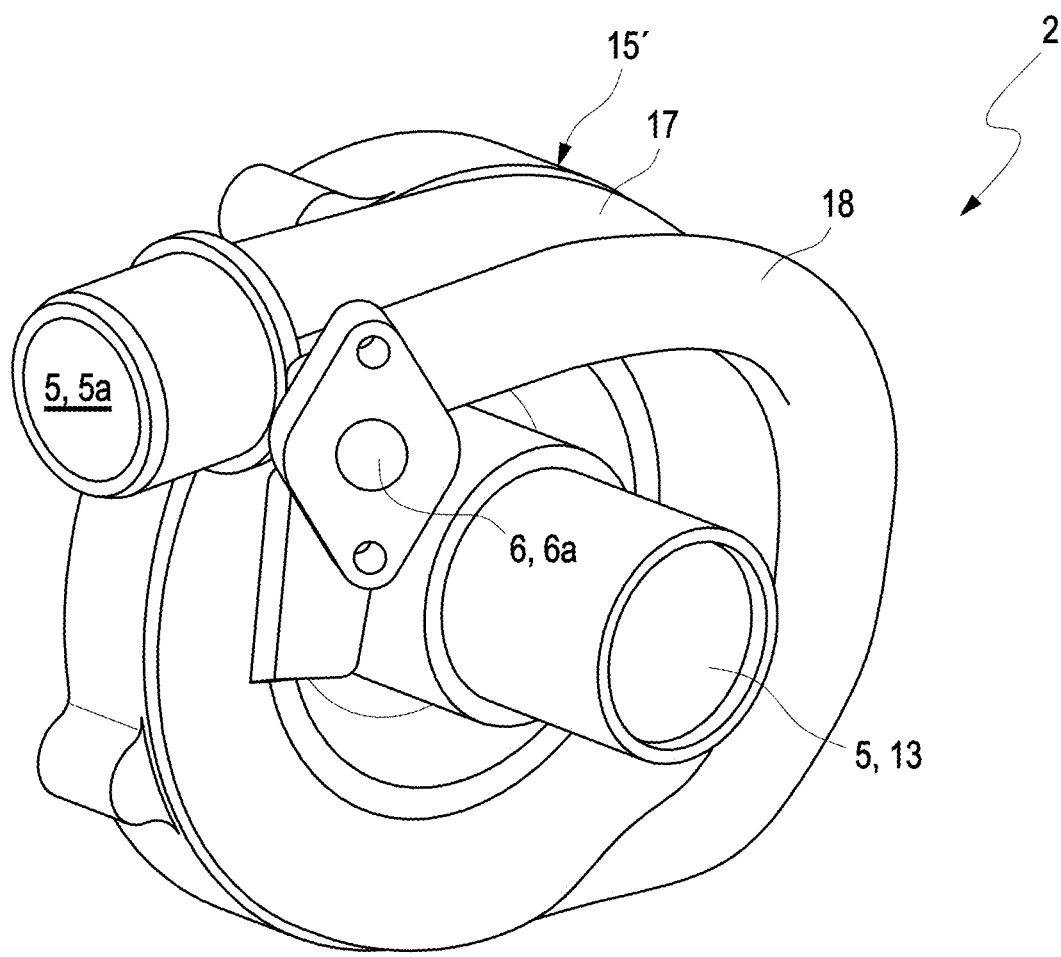
FIG. 8 shows a spatial view of a fourth exemplary embodiment of the compressor from FIG. 1.

In a fourth exemplary embodiment according to the invention according to FIG. 8, the two gas flows 5a, 6a are formed as different branches of a multi-port compressor housing 15'. Various combinations of mass flows and pressure ratios can hereby be generated in a simple manner, wherein, advantageously, only one compressor wheel 4 (not depicted in FIG. 8) is necessary. The electric motor is not depicted in FIG. 8, yet, as in the case of the exemplary embodiments according to FIG. 2 to FIG. 5, it is flanged laterally on the housing 15'.

Figure 9:
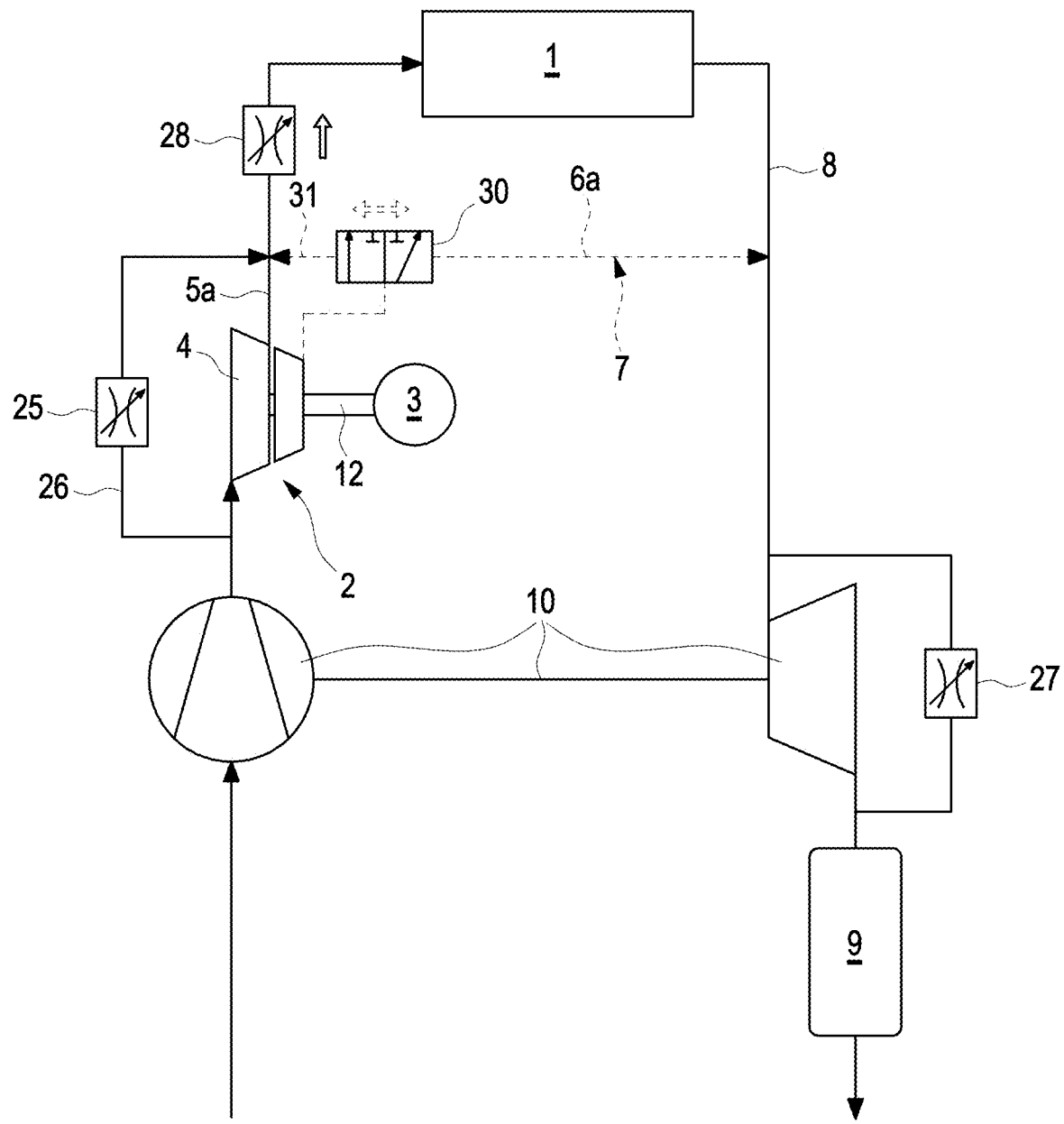
FIG. 9 shows a further functional diagram of a compressor according to the invention in a gas system of an internal combustion engine.

All of the embodiments described above of compressors 2 according to the invention can each be used in an arrangement or a gas system according to one of the functional diagrams according to FIG. 1 or FIG. 9.

In each of the gas systems according to FIG. 1 and FIG. 9, in at least one operating state, the second gas flow 6a of the second compressor path 6 opens into an exhaust gas flow 8 of the internal combustion engine 1 via a line upstream of a device for the post-treatment 9 of the exhaust gas, presently a catalytic converter. The exhaust gas post-treatment 9 of the catalytic converter 9 can hereby be quickly brought to an operating temperature by means of an exothermic reaction of the second gas flow 6a, e.g. with unburnt fuel.

The compressor 2 is arranged in the gas systems according to FIG. 1 and FIG. 9 of the internal combustion engine 1 in addition to the exhaust gas turbocharger 10. The compressor is arranged on the air side serially downstream of the exhaust gas turbocharger 10. Here, the exhaust gas turbocharger in stationary operation can extensively or completely take on fresh air induction, wherein the electrically driven compressor 2 is switched on as needed as the additional compressor steps. To so do, a bypass line 26 that can be switched by means of a valve 25 is provided, through which the compressor 2 is completely bypassed in the event of not being used. The valve 25 can be formed as a switching valve or as an adjustable restrictor valve.

The second compressor path 6 and the second gas flow 6a open upstream of the exhaust gas turbocharger 10 or its turbines into the exhaust gas flow of the internal combustion engine 1. The exhaust gas turbocharger 10 can presently be controlled via a bypass valve 27 on the turbine side in terms of its output.

An adjustable restrictor valve 28 is additionally integrated into the total gas flow leading to the internal combustion engine 1. According to need, the gas supply of the internal combustion engine 1 can hereby be restricted in general. Depending on the operating state, the conveying amount in the second compressor path 6 can be influenced by the restrictor valve 28 by retroactive effect.

In the pressure side second gas flow 6a, in each of the functional diagrams according to FIG. 1, FIG. 9, a valve 29, 30 is provided in order to interrupt the secondary air supply to the exhaust gas flow 8 as needed.

In the case of the first functional diagram according to FIG. 1, it is a simple, switchable blocking valve 29. Depending on the requirements, the blocking valve can also be formed as an adjustable restrictor valve set. When the blocking valve 29 is open, the gas or the fresh air of the second compressor path 6 flows into the exhaust gas flow 8. This switching position takes place, in particular, in the event of a cold start to quickly warm up the device for the exhaust gas post-treatment 9. With an internal combustion engine 1 that is warm from operation, the valve 29 is closed and the secondary air flow is interrupted. Here, the second compressor wheel 11 acts in opposition to a blocked line branch.

In the variant of a gas system according to FIG. 9, the valve 30 is formed as a multi-port valve, presently as a 2/3-port valve. In a first switching position, the second gas flow 6a, as in the functional diagram according to FIG. 1, is led into the exhaust gas flow 8. In the warm operating state, in contrast, a different switching position is chosen, in which the second gas flow 6a and the first gas flow 5a are guided together. To do so, a connection line 31 is provided between the valve 30 and the pressure side first gas flow 5a. Frictional losses of the second compressor path 6 are hereby avoided.

Yet in alternative functional diagrams not shown in the figures, the second compressor path 6 can also be led into the atmosphere when not in use or can be used for a different purpose with the internal combustion engine of vehicle systems.

LIST OF REFERENCE NUMERALS

1 Internal combustion engine
2 Compressor
3 Electric motor
4 First compressor wheel
5 First compressor path
5a First gas flow
6 Second compressor path
6a Second gas flow
7 Secondary air flow
8 Exhaust gas flow
9 Device for the post-treatment of exhaust gas, catalytic converter
10 Exhaust gas turbocharger
11 Second compressor wheel
12 Drive shaft
13 First inlet chamber, first gas supply
14 Second inlet chamber, second gas supply
15 Housing of the compressor
15' Multi-port compressor housing
16 Line of the second gas flow
17 First volute
18 Second volute
19 Pivot bearing
20 Base plate
21 First housing part
22 Second housing part
23 Central gas supply
24 Line of the first gas flow
25 Valve
26 Bypass line
27 Bypass valve turbocharger
28 Restrictor valve
29 Valve, variant blocking valve or restrictor valve
30 Valve, variant multi-port valve, 3/2-port valve
31 Connection line
A Axis of the drive shaft

The invention claimed is:
1. Compressor for inducting an internal combustion engine, comprising:

an electric motor (3) for driving a first compressor wheel (4), wherein, in at least one operating state, an inlet-side, first gas flow (5a) of the internal combustion engine (1) is compressed by the compressor (2), characterised in that the compressor (2) comprises a first compressor path (5) for the first gas flow (5a) and a second compressor path (6) for a second gas flow (6a), wherein the second gas flow (6a), in particular, in the at least one operating state as a secondary air flow (6a), opens into an exhaust gas flow (8) of the internal combustion engine (1) upstream of a device for the post-treatment (9) of exhaust gas.

2. Compressor according to claim 1, characterised in that the first compressor path (5) is operated via the first compressor wheel (4), and the second compressor path (6) is operated via a second compressor wheel (11), wherein the compressor wheels (4, 11), in particular, are arranged on a common drive shaft (12).

3. Compressor according to claim 2, characterised in that the compressor wheels (4, 11) each have an axially aligned gas supply (13, 14), wherein the compressor wheels (4, 11) are oriented in opposition relative to the gas supply (13, 14).

4. Compressor according to claim 2, characterised in that the compressor wheels (4, 11) each have an axially aligned gas supply (13, 14), wherein the compressor wheels (4, 11) are oriented in the same direction in relation to the gas supply (13, 14).

5. Compressor according to claim 2, characterised in that the two compressor wheels (4, 11) are arranged on the same side of the electric motor (3).

6. Compressor according to claim 2, characterised in that the electric motor (3) is arranged between the two compressor wheels (4, 11).

7. Compressor according to claim 1, characterised in that the two gas flows (5a, 6a) are formed as different branches of a multi-port compressor housing (15').

8. Compressor according to claim 1, wherein the device for the post-treatment (9) of exhaust gas is a catalytic converter.

9. Compressor according to claim 1, characterised in that the compressor (2) is arranged in a gas system of the internal combustion engine (1) in addition to an exhaust gas turbocharger (10), in particular on an air side in series upstream or downstream of the exhaust gas turbocharger (10).

10. Compressor according to claim 9, characterised in that the second compressor path (6) opens into an exhaust gas flow (8) of the internal combustion engine (1) upstream or downstream of the exhaust gas turbocharger.

11. Compressor according to claim 1, characterised in that, in another operating state, the second gas flow (6a) and the first gas flow (5a) are guided together.

* * * * *